Dec. 12, 1933.     L. F. NENNINGER     1,938,777
MILLING MACHINE
Filed March 20, 1930     2 Sheets-Sheet 1
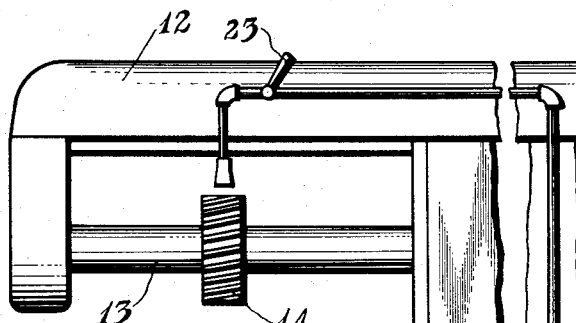
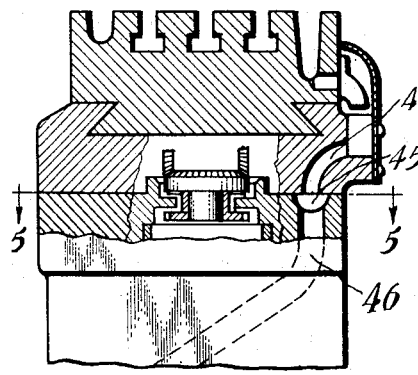
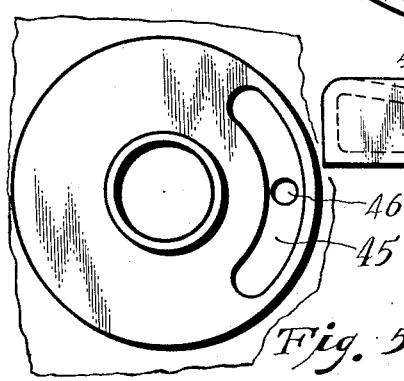
Lester F. Nenninger
By A. K. Parsons
Attorney

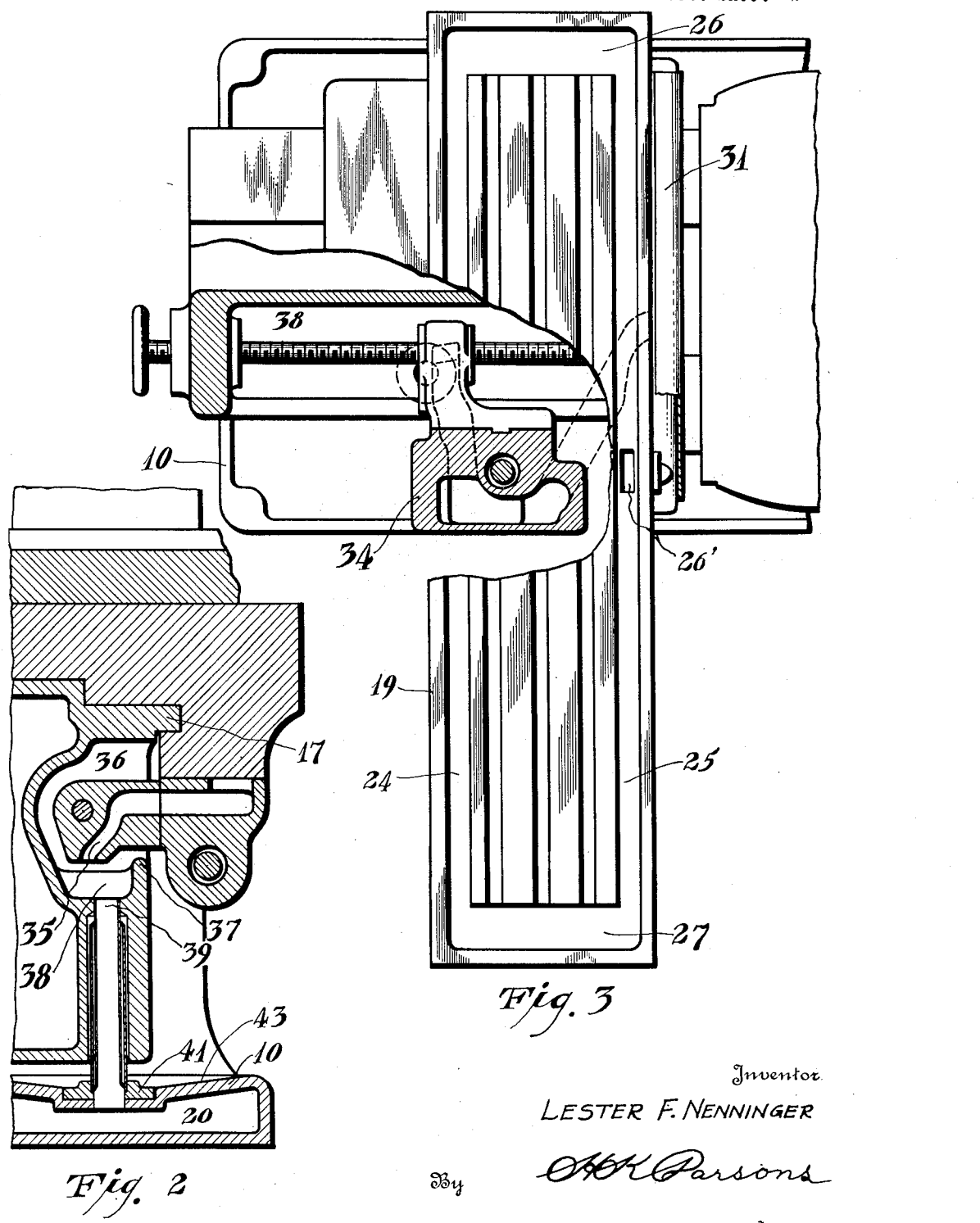

Patented Dec. 12, 1933

1,938,777

UNITED STATES PATENT OFFICE 1,938,777

MILLING MACHINE

Lester F. Nenninger, Cincinnati, Ohio, assignor to The Cincinnati Milling Machine Company, Cincinnati, Ohio, a corporation of Ohio Application March 20, 1930. Serial No. 437,522

6 Claims. (Cl. 90—11)

This invention relates to machine tools and more particularly to an improved coolant system therefor.

The improvements contemplated by this invention are directed to a coolant system for milling machines and more specifically that type of machine which has the work supporting means subdivided into a plurality of components. Such machines, commercially known as the knee and column type, have the work bolted to a platen member usually termed a table, which is reciprocably mounted upon a second component known as the saddle which, in turn, is slidably mounted upon a third part called the knee. The latter is adjustably mounted on fixed stationary guides formed on the machine column. Since these components are movable with respect to the fixed part of the machine, and with respect to each other, considerable difficulty has been experienced in providing for the proper disposal of a coolant falling on the table during a machining operation. It is therefore one of the principal objects of this invention to provide a milling machine in which these three components are so designed and assembled that each will have adequate means for successively receiving and conveying to the next member the coolant which falls on the table and irrespective of their various positions of adjustment.

Another object of this invention is the provision of a coolant system for a milling machine in which the return channels or conduits are adapted to handle a more copious flow of coolant, thus preventing the liquid from overflowing and cascading down over the machine parts.

A further object of this invention is the provision of a coolant supply system in which the flow channels are protected to prevent accumulation therein of falling chips while still being readily accessible for cleaning.

Further objects and advantages of the present invention should be readily apparent by reference to the following specification, considered in conjunction with the accompanying drawings illustrative of one embodiment thereof, but it will be understood that any modifications may be made in the exact structural details hereinafter disclosed, within the scope of the appended claims, without departing from or exceeding the spirit of the invention.

Referring to the drawings, in which like reference numerals indicate like parts:

Figure 1 is a side elevation of a milling machine embodying the principles of this invention.

Figure 2 is a vertical section on the line 2—2 of Figure 1;

Figure 3 is a plan view of the machine partly in section.

Figure 4 is a partial sectional view showing the arrangement of the flow channels in a universal machine.

Figure 5 is a section on the line 5—5 on Figure 4.

The improvements constituting this invention are embodied in a knee and column type of milling machine shown in Figure 1, in which the reference numeral 10 indicates the base, having rising therefrom the column 11, upon the top of which is mounted the overarm 12 which supports the outer end of the cutter arbor 13 carrying the cutter 14, the arbor adapted to be driven by a spindle journaled in the column.

Slidably mounted on fixed guides 15 of the column is the knee 16 having guideways 17 formed thereon for receiving the saddle 18 which is adjustable in and out with respect to the column and which supports the reciprocating table 19 adapted to subject a work piece bolted thereto to the action of the cutting tool.

In order to machine the work more efficiently and prevent overheating of the parts, such machines are usually provided with a coolant supply system which, in this case, takes the form of a coolant reservoir 20 formed in the base of the machine, a supply pipe 21 from which the lubricant is elevated and supplied to the cutter 14 by the pump 22. A valve 23 is provided in the pipe 21 to control the amount of coolant flowing on the cutter. The coolant falling on the table is then collected by drain channels formed therein and flows by gravity through channels formed in the saddle and knee back to the reservoir in the base of the machine.

The drain channels formed in the table comprise the parallel troughs 24 and 25 which extend longitudinally of the table, the trough 25 being the deeper and having its floor sloping gradually towards the discharge outlet 26'. Coolant collecting in the trough 24 is conveyed to the trough 25 by the flow channels 26 and 27 formed at each end of the table.

In order to convey the coolant to the saddle, it has been somewhat the practice in prior structures to form a vertical passageway in the outlet communicating with a longitudinal slot formed in the horizontal guideway of the saddle which supports the table. This slot being located beneath the table, it became necessary to remove the latter in order to obtain access to the slot for cleaning purposes. Such a construction not only reduced the bearing area of the guideway but somewhat weakened the structure. This disadvantage has been overcome in the present structure by providing a short channel 28 in the side of the table communicating with the outlet 26' and terminating exteriorly in a nozzle 29 for discharging the coolant to the saddle.

The saddle 18, upon which the table is slidably mounted, has integrally formed on one longitudinal edge thereof a receiving trough or channel 30 which has the removable side 31, held in place by the screws 32. This side is extended upward and curved inward toward the table housing the nozzle 29 and forming a guard over the trough thereby preventing falling chips from collecting therein. Also the side 31 is open at the ends to permit access to the trough for cleaning purposes. This construction has the advantage of ready access for cleaning while at the same time protecting the trough from falling material. From Figures 1 and 3 it will be evident that irrespective of the longitudinal movements of the table, communication will always be maintained between the table outlet and the receiving trough.

In order to convey the coolant from the saddle to the knee, a channel extends through the pendant portion 34 and terminates in a discharge outlet 35. The pendant portion extends into the depression 36 formed in the side of the knee so that the outlet 35 discharges therein.

A web 37 extends longitudinally of the depression forming a pocket for receiving the flow from the outlet 35. The bottom 38 of the pocket is inclined to drain toward the outlet 39 which has threaded therein a terminal member of the telescoping pipe connection 40 which extends to the base 10 of the machine.

The lower terminal member of the telescoping pipe is fastened to a plate 41 let into the top of the base 10 which is provided with a screened opening 42 permitting any liquid which might collect on the sloping surfaces 43 of the base to drain into the reservoir.

In some types of machines, commercially known as universal milling machines, the saddle is divided, the upper part being pivotally mounted upon the lower part to permit of angular adjustment of the table. In such cases the channel 33 is divided into two sections as shown in Figure 4. A channel 44 is formed in the upper saddle which discharges into an arc-shaped receiving trough 45 formed in the lower saddle thus permitting relative angular adjustments of the two members without interfering with the return flow of the coolant. Communicating with the trough 45 is the channel 46 which discharges into the knee in the same manner as described above.

The advantages of this structure should be apparent but attention is called to the fact that there is no direct connection beween the table and saddle or between the saddle and knee thereby doing away with flexible piping and making it possible to convey the coolant through a plurality of movable supports without the use of extraneous piping. Attention is invited to the fact that although the receiving channels extend the length of the saddle and knee yet these channels are covered and protected from falling chips thereby preventing the possibility of the channels becoming stopped up or from the material being washed down into the reservoir.

I claim:

1. In a milling machine having a table, saddle and knee, means in the table to collect a coolant falling thereon, and conduct it to the saddle having gravity channel means for conveying it to the knee, means in the knee for returning the coolant to a reservoir comprising a longitudinal pocket formed in the side wall of the knee said channels projecting laterally into said pocket, the bottom of said pocket being inclined toward a central outlet, a telescopic channel having terminal members connected to said outlet and to said reservoir respectively.

2. A milling machine having a supporting frame, a plurality of movable supports mounted thereon, the uppermost of which is adapted to collect a falling coolant, a coolant reservoir in the base of the frame, means to conduct the coolant back to the reservoir comprising a discharge nozzle in the uppermost support, an enclosed receiving channel and a discharge outlet connected therewith formed in each of the remaining supports, each channel having a longitudinal side opening into which projects the discharge outlet of the superjacent support, the outlet of the last support communicating by means of an extensible pipe with the reservoir, whereby falling chips are prevented from collecting in the channels and being carried to the reservoir.

3. In a milling machine having a column and a cutter spindle journaled therein, a table, saddle and knee mounted on the column and movable with respect to each other and with respect to the column, a coolant reservoir formed in the base of the column, means to elevate and supply a coolant liquid to the cutter, means to collect the coolant falling on the table including collecting channels formed therein, a discharge outlet formed in the side of the table having a nozzle projecting therefrom, a ledge projecting from the side of the saddle beyond the edge of the table and beneath said nozzle, a detachable side wall attached to the ledge to form a receiving channel, said wall extending upward in circumscribing relation to the nozzle to inclose the same and form a covering for said channel, an interior communicating passageway formed in the saddle, a longitudinal pocket formed in the side wall of the knee, said passageway terminating in a discharge nozzle projecting laterally into said pocket, an outlet formed in the floor of said pocket, an opening in the top wall of the reservoir and an extensible channel attached at opposite ends to the pocket outlet and to the reservoir opening whereby coolant may be returned thereto in all adjustable positions of the part.

4. A milling machine comprising a column, means journaled in the column for rotating a cutter, a knee, saddle and table mounted on the column to support a work piece in adjacent relation to the cutter, a coolant reservoir formed in the base of the column, means in the column to deliver coolant from the reservoir to the cutter, means in the work support organization to collect the coolant and return the same to the reservoir including a receiving channel formed in the side of the table adjacent the column, a ledge formed integral with the saddle and projecting beyond the side of said table, a discharge outlet formed in the side of the table and centrally of the receiving channel therein, a detachable side wall attached to the ledge and extending upward in circumscribing relation to the outlet to form a receiving channel in the saddle, said side wall terminating in adjacent relation to the side of the table to form a protective covering for the receiving channel in the saddle, a coolant receiving pocket formed in the knee, a cored discharge channel formed in the saddle for conducting the coolant from the receiving channel in the saddle to the knee and channel means carried by the knee for returning the coolant to the reservoir in all adjustable positions of the knee.

5. A milling machine having a supporting frame, a plurality of movable supports mounted thereon, the uppermost of which is adapted to collect a falling coolant, a coolant reservoir formed in the base of the frame, pumping means carried by the frame for delivering the coolant from the reservoir to a cutting tool carried by the frame in adjacent relation to the supports, means to return the coolant to reservoir comprising a discharge nozzle in the uppermost support, an inclosed receiving channel and a discharge outlet communicating therewith formed in each of the remaining supports, each channel having a longitudinal side opening for receiving the discharge outlet of the superadjacent support, the outlet of the last support being connected by means of an extensible pipe with said reservoir.

6. In a milling machine having a column, a knee, saddle and table mounted on the column for movement with respect to each other and with respect to the column, and a cutter rotatably supported by the column above the table, the combination of means for delivering a coolant to the cutter and collecting the same including a reservoir formed in the base of the column, means to elevate the coolant and deliver it to the cutter, collecting channels formed in the table, a discharge outlet formed in the side of the table having a nozzle projecting therefrom, a ledge projecting from the side of the saddle beyond the edge of the table and beneath said nozzle, a detachable side wall attached to the ledge to form a receiving channel, said wall extending upward in circumscribing relation to the nozzle to inclose the same and form a covering for said channel, said saddle being horizontally divided, the upper part pivoting on the lower part, a horizontal arcuate-shaped channel formed in the lower part of the saddle, a cored channel formed in the upper part of the saddle for conducting fluid from the receiving channel in the saddle to said arcuate-shaped channel, a longitudinal pocket formed in the side wall of the knee, a passageway leading from said arcuate-shaped channel and terminating in a discharge nozzle projecting laterally into said pocket, and extensible channel means connecting the pocket to the reservoir.

LESTER F. NENNINGER.